US010301523B2

(12) United States Patent
Savari et al.

(10) Patent No.: US 10,301,523 B2
(45) Date of Patent: May 28, 2019

(54) SURFACE TREATED LOST CIRCULATION MATERIAL

(71) Applicant: HALLIBURTON ENERGY SERVICES, INC., Houston, TX (US)

(72) Inventors: Sharath Savari, Stafford, TX (US); B. Raghava Reddy, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 376 days.

(21) Appl. No.: 14/913,761

(22) PCT Filed: Oct. 18, 2013

(86) PCT No.: PCT/US2013/065702
§ 371 (c)(1),
(2) Date: Feb. 23, 2016

(87) PCT Pub. No.: WO2015/057244
PCT Pub. Date: Apr. 23, 2015

(65) Prior Publication Data
US 2016/0230064 A1 Aug. 11, 2016

(51) Int. Cl.
*C09K 8/035* (2006.01)
*E21B 21/00* (2006.01)
*C09K 8/03* (2006.01)

(52) U.S. Cl.
CPC .............. *C09K 8/035* (2013.01); *C09K 8/032* (2013.01); *E21B 21/003* (2013.01)

(58) Field of Classification Search
None
See application file for complete search history.

(56) References Cited

U.S. PATENT DOCUMENTS

| | | | | |
|---|---|---|---|---|
| 3,336,979 | A * | 8/1967 | Ingraham | C09K 8/805 166/280.1 |
| 4,105,824 | A | 8/1978 | Monte | |
| 4,460,052 | A | 7/1984 | Gockel | |
| 5,582,249 | A | 12/1996 | Caveny et al. | |
| 5,775,425 | A | 7/1998 | Weaver et al. | |
| 5,833,000 | A | 11/1998 | Weaver et al. | |
| 5,839,510 | A | 11/1998 | Weaver et al. | |
| 5,853,048 | A | 12/1998 | Weaver et al. | |
| 5,871,049 | A | 2/1999 | Weaver et al. | |
| 6,209,643 | B1 * | 4/2001 | Nguyen | C09K 8/5086 166/276 |

(Continued)

OTHER PUBLICATIONS

International Search Report and Written Opinion of the International Searching Authority dated Jul. 17, 2014, filed in related application PCT/US2013/065702.

(Continued)

*Primary Examiner* — Anuradha Ahuja
(74) *Attorney, Agent, or Firm* — McAfee & Taft

(57) ABSTRACT

A granular lost circulation material for use in a wellbore during drilling operations to minimize loss of drilling fluid at a lost circulation area is disclosed. The granular lost circulation material comprises a granular material and a non-hardening tackifying agent. The granular material is coated with the non-hardening tackifying agent. The granular lost circulation material forms agglomerated particles, which form a filter cake at the lost circulation area.

22 Claims, 1 Drawing Sheet

(56) References Cited

U.S. PATENT DOCUMENTS

| | | | | |
|---|---|---|---|---|
| 6,742,590 | B1 | 6/2004 | Nguyen | |
| 7,799,743 | B2 | 9/2010 | Way et al. | |
| 8,132,623 | B2 * | 3/2012 | Allin | C09K 8/5083 166/292 |
| 8,360,272 | B2 | 1/2013 | Piersant et al. | |
| 2002/0037977 | A1 * | 3/2002 | Feldstein | A61K 9/7053 526/60 |
| 2003/0195120 | A1 * | 10/2003 | Halliday | C09K 8/16 507/140 |
| 2004/0014608 | A1 * | 1/2004 | Nguyen | C09K 8/685 507/200 |
| 2006/0157243 | A1 * | 7/2006 | Nguyen | C09K 8/805 166/280.2 |
| 2007/0029086 | A1 * | 2/2007 | East, Jr. | E21B 43/14 166/278 |
| 2007/0042912 | A1 * | 2/2007 | Welton | C09K 8/508 507/203 |
| 2007/0244014 | A1 * | 10/2007 | Weaver | C09K 8/035 507/215 |
| 2007/0277978 | A1 * | 12/2007 | Reddy | C09K 8/5086 166/276 |
| 2007/0281867 | A1 * | 12/2007 | Massam | E21B 21/00 507/200 |
| 2008/0064613 | A1 * | 3/2008 | Massam | C09K 8/03 507/137 |
| 2008/0070808 | A1 * | 3/2008 | Munoz | C09K 8/5086 507/117 |
| 2008/0161210 | A1 * | 7/2008 | Welton | C09K 8/68 507/218 |
| 2009/0258799 | A1 * | 10/2009 | Hodder | C09K 8/032 507/140 |
| 2010/0004146 | A1 * | 1/2010 | Panga | C04B 28/02 507/212 |
| 2010/0298175 | A1 * | 11/2010 | Ghassemzadeh | C09K 8/5045 507/124 |
| 2010/0300760 | A1 | 12/2010 | Beardmore et al. | |
| 2010/0307749 | A1 * | 12/2010 | Nguyen | C09K 8/805 166/278 |
| 2011/0214862 | A1 * | 9/2011 | Horton | C09K 8/03 166/283 |
| 2011/0232908 | A1 | 9/2011 | Laza et al. | |
| 2011/0278006 | A1 | 11/2011 | Sanders et al. | |
| 2015/0292279 | A1 * | 10/2015 | Wang | C09K 8/03 166/293 |

OTHER PUBLICATIONS

Polyacrylamides, Polymer Property Database (http://polymerdatabase.com/Polyacrylamidetype.html), 2015.

* cited by examiner

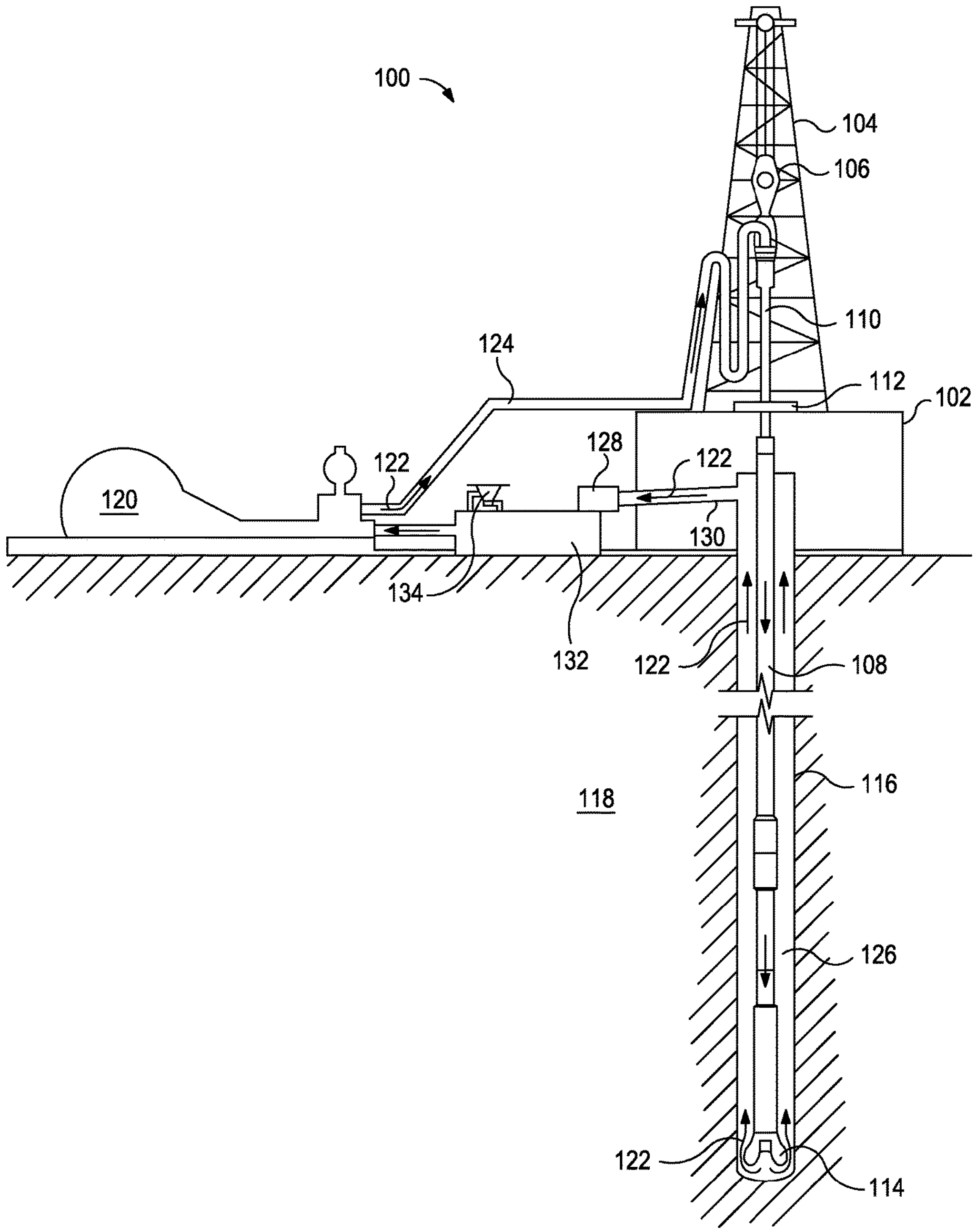
100
104
106
110
124
112
102
128
122
122
120
130
134
132
122
108
118
116
126
122
114

SURFACE TREATED LOST CIRCULATION MATERIAL

FIELD

This disclosure relates to drilling wells for producing fluids such as oil and gas and, particularly, to drilling wells where lost circulation is a concern.

BACKGROUND

In the process of drilling oil and gas wells, drilling fluid (also known as drilling mud) is injected through the drill string to flow down to the drill bit and back up to the surface in the annulus between the outside of the drill string and the wellbore to carry the drill cuttings away from the bottom of the wellbore and out of the hole. The drilling fluid is also used to prevent blowouts or kicks when the wellbore is kept substantially full of drilling fluid by maintaining head pressure on the formations being penetrated by the drill bit. A blowout or kick occurs when high pressure fluids such as oil and gas in downhole formations are released into the wellbore and rise rapidly to the surface. At the surface these fluids can potentially release considerable energy that is hazardous to people and equipment. The drilling fluids used for drilling oil and gas wells have been developed with weighting (densifying) agents to provide sufficient head pressure to prevent the initial release of high pressure fluids and gases from the formation. However, density alone does not solve the problem as the drilling fluid may drain into one or more formations downhole lowering the volume of drilling fluid in the hole and, thus, head pressure for the wellbore. The situation where drilling fluid is draining into one or more formations is called "lost circulation" or sometimes by other terms, such as "seepage loss" or simply "fluid loss" depending on the extent and rate of fluid volume losses to the formation.

Lost circulation and stuck pipe are two of the most costly problems faced while drilling oil and gas wells. To reduce the likelihood of lost circulation, particles of "lost circulation material" (commonly called "LCM") are added to drilling fluids to plug the formations into which the drilling fluid is being lost. It is a simple and elegant solution in that the particles flow toward the leaking formation carried by the drilling fluid and then collect in the leaking formation at the side of the wellbore.

One type of lost circulation material is granular lost circulation material, which is a material chunky in shape and prepared in a range of particle sizes. Ideally, granular LCM should be insoluble and inert to the mud system in which it is used. Examples of granular LCM are ground and sized limestone or marble, wood, nut hulls, Formica laminate, corncobs and cotton hulls. Ground and sized marble can be desirable as a LCM because of its low cost and acid solubility. The latter allowing for removal of the LCM upon completion of the drilling and/or well completion operations. Unfortunately, granular LCM, in general, and marble, in particularly, is subject to degradation of particle size under shear stress such as it experiences downhole in well drilling and completion operations. Such degradation of particle size can adversely affect the granular LCM's function in the wellbore.

BRIEF DESCRIPTION OF THE DRAWINGS

FIG. 1 is a schematic illustration generally depicting a land-based drilling assembly.

DETAILED DESCRIPTION

The exemplary compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed compositions may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid or drilling mud 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed compositions may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed compositions may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed compositions may be stored, reconditioned, and/or regulated until added to the drilling fluid 122.

As mentioned above, the disclosed compositions may directly or indirectly affect the components and equipment of the drilling assembly 100. For example, the disclosed compositions may directly or indirectly affect the fluid processing unit(s) 128 which may include, but are not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, and any fluid reclamation equipment. The fluid processing unit(s) 128 may further include one or more sensors, gauges, pumps, compressors, and the like used to store, monitor, regulate, and/or recondition the exemplary compositions.

The disclosed compositions may directly or indirectly affect the pump 120, which representatively includes any conduits, pipelines, trucks, tubulars, and/or pipes used to fluidically convey the compositions downhole, any pumps, compressors, or motors (e.g., topside or downhole) used to drive the compositions into motion, any valves or related joints used to regulate the pressure or flow rate of the compositions, and any sensors (i.e., pressure, temperature, flow rate, etc.), gauges, and/or combinations thereof, and the like. The disclosed compositions may also directly or indirectly affect the mixing hopper 134 and the retention pit 132 and their assorted variations.

The disclosed compositions may also directly or indirectly affect the various downhole equipment and tools that may come into contact with the compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed compositions may also directly or indirectly affect any downhole heat exchangers, valves and corresponding actuation devices, tool seals, packers and other wellbore isolation devices or components, and the like associated with the wellbore 116. The disclosed compositions may also directly or indirectly affect the drill bit 114, which may include, but is not limited to, roller cone bits, PDC bits, natural diamond bits, any hole openers, reamers, coring bits, etc.

While not specifically illustrated herein, the disclosed compositions may also directly or indirectly affect any transport or delivery equipment used to convey the compositions to the drilling assembly 100 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

As the afore-described wellbore is drilled from the surface down into the earth through many layers of rock, sand, shale, clay and other formations, many of these formations are relatively impermeable. In other words, these low permeability formations generally do not accommodate substantial amounts of liquids or permit gas or liquids to pass through. However, there are formations that are permeable and some of these permeable formations have fluids that are under pressure. The fluids primarily include both salt and fresh water but may include oil, natural gas and mixtures of these and other fluids. Fluids that are under pressure in formations in the ground present a concern to the drilling operators in that a lot of force may be released through the penetration of such formations by the drilling equipment. In the event of an uncontrolled release, such high pressure fluids into the wellbore may cause a destructive blowout.

As described above, to maintain control of these high pressure fluids, drilling fluids have been developed that have high density to maintain high wellbore pressure that is higher than any expected formation pressure. High density is conventionally achieved by the addition of weighting agents or densifying agents that comprise small, but very dense particles. Particle sizes of such weighting agents are typically less than 100 microns. Even without weighting agents, drilling fluids typically accumulate very small particles called drill solids that are also about 100 microns or less. The drilling fluid accumulates particles of this size as they are believed to be created as cuttings break-up or fracture and, because of their small size, are not removed by the mesh size of the shakers. Thus, drill cuttings larger than 100 microns are typically removed at the surface to avoid drilling fluid becoming overwhelmed with cuttings before being recirculated into the well.

Drilling fluids (also referred to as drilling muds) have a number of functions such as lubricating moving parts, cooling the bit and carrying drill cuttings to the surface. The maintenance of wellbore pressure is simply another important function of drilling mud or drilling fluid. However, the drilling fluid level must be closely monitored as the drill bit will encounter and create fractures, fissures and highly porous regions that will receive or retain the drilling fluid. Drilling fluid is continuously added to the wellbore, but in the event that fluid loss is substantially faster than the rate that the drilling fluid is added, the fluid head pressure in the wellbore reduces and the likelihood of experiencing a kick or blowout increases. Again, drilling fluid technology has advanced to aid in managing this situation as well. In particular, modern drilling fluids include particles (known as lost circulation material or LCM) that plug/bridge at the fractures, fissures, vugs and porous regions to close off these openings to control fluid loss. These particles collect at these porous formations forming a plug, or filter cake where the liquid fluid has already passed out of the wellbore and into the formation.

Granular lost circulation material such as limestone and marble can be subject to particle-size attrition due to shearing during use. The operation of the drill bit and high pressure of the drilling mud can create significant shear forces that can cause degrading of the LCM particle and, hence, reduction in particle size, which adversely affects the effectiveness of the LCM; that is, the LCM becomes inefficient in plugging/bridging the pores or fractures. In one embodiment, this difficulty in the use of granular lost circulation material is overcome by the use of a granular lost circulation material comprising a granular material and a non-hardening tackifying agent, wherein the granular material is coated with the non-hardening tackifying agent. It has been discovered that the non-hardening tackifying agent reduces the effects of the shear so that it, in effect, imparts a resistance to shear degradation to the granular material. Additionally, if there is particle degradation, the resulting smaller fragments will be held together by the coating of non-hardening tackifying agent into one or more agglomerated particles thereby maintaining the agglomerated particle size close to the original particle size distribution. The resulting agglomerated particles can form an effective filter cake at the lost circulation areas at the periphery of the wellbore.

Additionally, the use of non-hardening tackifying agents can allow for the effective increase in particle size of the granular lost circulation material due to agglomeration of the particles at the lost circulation area at the periphery of the wellbore. This agglomeration is due to loose adhesion among particles by the surface coating of non-hardening tackifying agent. To better take advantage of this effect, in one embodiment the granular material has a d50 particle size of from about 25 μm to about 1500 μm and forms a plurality of agglomerated particles at the lost circulation areas. At least a portion and generally the majority of the agglomerated particles have a d50 size of at least 2000 μm and the d50 size can be at least 2250 μm or can be at least 2500 μm. In another embodiment, the granular material has a d50 particle size of from 25 μm to 1000 μm and forms a plurality of agglomerated particles at the lost circulation areas, at least a portion of the agglomerated particles having a d50 size of at least 2000 μm and the d50 size can be at least 2250 μm or can be at least 2500 μm. Preferably, in these embodiments the granular material is selected to be made up of three or more portions each with a different d50 size. Thus, the granular material can have a first portion having a d50 size of from 5 μm to 100 μm, a second portion having a d50 size of from 100 μm to 500 μm and a third portion having a d50 size from 500 μm to 2000 μm. Generally, each portion would have a different size. Alternatively, the granular material can have a first portion having a d50 size of from 25 μm to less than 100 μm, a second portion having a d50 size of from 100 μm to less than 500 μm and a third portion having a d50 size from 500 μm to 1500 μm. In one example, the granular material is made up of a first portion having a d50 size about 50 μm, a second portion having a d50 size of about 150 μm and a third portion having a d50 size of about 1500 μm. Since smaller size particles will generally undergo less degradation under shear, in a preferred embodiment the granular material has a d50 size of less than about 500 μm and can have a first portion having a d50 size of from 25 μm to 75 μm, a second portion having a d50 size of from 75 μm to 150 μm and a third portion having a d50 size from 150 μm to 500 μm with each portion having a different size. The relative small particle size still creates an effective filter cake at the lost circulation areas at the periphery of the wellbore because of the agglomeration of the particles caused by the non-hardening tackifying agent.

The granular material can be any suitable granular lost circulation material but preferably, is selected from the group comprising carbonate minerals and combinations thereof. For example, the granular material can be calcite and/or dolomite. Preferably, the granular material is a metamorphic rock comprised of recrystallized carbonate mineral, such as marble.

The non-hardening tackifying agent utilized in accordance with this invention can be a liquid or a solution of a compound capable of forming a non-hardening tacky coating on the granular material. In an embodiment, the non-hardening tackifying agent is a pressure-sensitive adhesive material. In another embodiment, the non-hardening tackifying agent is a viscoelastic.

One group of non-hardening tackifying agents that can be utilized are polyamides, which are liquids or solutions in organic solvents at surface temperatures or at the temperature of the subterranean formation to be treated such that the polyamides are, by themselves, non-hardening when present on the granular material introduced into the subterranean formation. A particularly preferred product is a condensation reaction product comprised of commercially available polyacids and a polyamine. Such commercial products include compounds such as mixtures of C36 dibasic acids containing some trimer and higher oligomers and also small amounts of monomer acids which are reacted with polyamines (for example, ethylene diamine, diethylene triamine, triethylene tertramine or tetraethylene pentamine and the like). Other polyacids include trimer acids, synthetic acids produced from fatty acids, maleic anhydride, acrylic acid and the like. Such acid compounds are available from companies such as Witco, Union Camp, Chemtall and Emery Industries. The reaction products are available from, for example, Champion Chemicals, Inc.

The polyamides can be converted to quaternary compounds by reaction with methyl iodide, dimethyl sulfate, benzylchloride, diethyl sulfate and the like. Typically, the quaternization reaction can be effected at a temperature of from about 100° F. to about 200° F. over a time period of from about 4 to 6 hours.

The quaternization reaction can be employed to improve the chemical compatibility of the tackifying agent with the other chemicals utilized in the treatment fluids. Quaternization of the tackifying agent can reduce effects upon breakers in the carrier fluid and reduce or minimize the buffer effects of the compounds when present in carrier fluids.

Additional compounds which can be utilized as tackifying agents include liquids and solutions of, for example, polyacrylates, polyesters, polyethers and polycarbamates, polycarbonates, styrene/butadiene lattices, natural or synthetic resins such as shellac, rosin acid esters and the like. In an embodiment, the tackifying agent is a pressure sensitive adhesive. Suitable examples of pressure sensitive materials include silicones, polyacrylates, terpenes aromatic resins, pine resins, hydrogenated hydrocarbon resins, polyisobutylenes, and tepene-phenol resins and the like. In an embodiment, the non-hardening tackifying agent is made viscoelastic by the addition of an elastomeric material. Suitable examples of elastomeric materials, which can be dissolved into the non-hardening tackifying compositions, include poly(alpha-methylstyrene), styrene-butadiene copolymers, silicones and the like.

The non-hardening tackifying agent used can be coated on dry solid particles and then the coated solid particles mixed with the drilling mud or the tackifying agent can be mixed with the drilling mud containing suspended granular material and coated thereon. It is important that the base fluid used in preparing the drilling fluid does not dissolve the tackifying agent. In an embodiment, the drilling fluid is made in aqueous fluid as the base fluid. Aqueous fluids suitable for use as base fluids include fresh water, salt water, brine water, formation water and the like. In either procedure, the tackifying agent is coated on the granular material in an amount of from about 0.01% to about 5% by weight of the solid particles. More preferably, the non-hardening tackifying agent is coated on the solid particles in an amount in the range of from about 0.5% to about 2% by weight of the solid particles.

In one embodiment, the granular lost circulation material is used in a process for drilling a wellbore with a drill bit on the end of a drill string, with minimal loss of drilling fluid. The process comprises providing a drilling fluid with the granular lost circulation material which comprising a granular material that has been coated with a non-hardening tackifying agent. The drilling fluid is introduced during drilling such that the granular lost circulation material forms plugs at lost circulation areas at the periphery of the wellbore, or near the wellbore, forms a filter cake at such lost circulation areas and blocks or reduces fluid flow from the wellbore into the lost circulation areas.

Generally, the drilling fluid utilized in the process will be an aqueous based drilling mud incorporating a clay, such as bentonite, but can be other suitable drilling fluid that will not be destructive to the non-hardening tackifying agent coating on the granular particle, nor interfere with the agglomeration of the granular lost circulation material. The concentration of the granular lost circulation material in the drilling fluid should be about 0.5 to 15 ppb (pounds per barrel of drilling fluid). In practice, the granular lost circulation material is added to the drilling fluid continuously at this concentration while drilling.

Example

The following prophetic example illustrates the use of one embodiment of the current LCM with an oil well drilling process First, a granular lost circulation material is prepared by coating a granular marble material comprised of a first portion of marble having a d50 particle size about 50 μm, a second portion having a d50 particle size of about 100 μm and a third portion having a d50 particle size of about 500 μm with a polyisobutylene tackifying agent. The particles are coated such that the resulting lost circulation material comprises a tackifying agent in an amount of about 2% by weight of the granular marble particles. The lost circulation material is then introduced into aqueous based drilling fluid incorporating bentonite clay. The lost circulation material is present in the drilling fluid in an amount of about 10 ppb of drilling fluid. The lost circulation material forms agglomerated particles having a d50 particle size of greater than 2000 μm.

Next the drilling fluid is introduced downhole into and through a drill string extending down the wellbore and connected at its downhole end to a drill head. As the drilling fluid reaches the drill head, it flows through the hollow interior of the drill and through apertures on the drill head where it exits into the wellbore (or borehole) in the region between the borehole wall and the drill head and, subsequently flows upward through the annulus, between the wellbore and outside of the drill string.

The lost circulation material is drawn toward areas of fluid loss. Agglomerated particles of the lost circulation material, generally having a d50 particle size of greater than 2000 μm, plugs or bridges the areas of fluid loss to reduce and/or prevent further fluid loss.

In accordance with the above disclosure and prophetic example, selected embodiments of the invention will now be described. In one embodiment there is a process for drilling a wellbore with a drill bit on the end of a drill string with minimal loss of drilling fluid. The process comprises (a) providing a drilling fluid with a granular lost circulation material comprising a granular material, which has been coated with a non-hardening tackifying agent;

(b) introducing the drilling fluid during drilling such that the granular lost circulation material forms plugs at lost circulation areas at the periphery of the wellbore and forms a filter cake at such lost circulation areas and blocks or reduces fluid flow from the wellbore into the lost circulation areas.

The granular material of the process can haves a d50 particle size of from about 25 μm to about 1500 μm. The granular lost circulation material forms a plurality of agglomerated particles at the lost circulation areas, at least a portion of the agglomerated particles having a d50 size of at least 2000 μm. Additionally, the granular material can comprise a first portion having a d50 size from 5 μm to 75 μm, a second portion having a d50 size of from 100 μm to 200 μm and a third portion having a d50 size from 500 μm to 1500 μm.

In another embodiment the granular material of the process has a d50 particle size of from about 25 μm to about 1000 μm and the granular lost circulation material forms a plurality of agglomerated particles at the lost circulation areas, at least a portion of the agglomerated particles having a d50 size of at least 2000 μm. Additionally, the granular material can comprise a first portion having a d50 size of from 25 μm to 75 μm, a second portion having a d50 size of from 75 μm to 150 μm and a third portion having a d50 size from 150 μm to 500 μm with each portion having a different size.

In some embodiments, the granular lost circulation material consists essentially of the granular material coated with the non-hardening tackifying agent and the granular material consists essentially of three portions: a first portion having a d50 size from 5 μm to less than 100 μm, a second portion having a d50 size of from 100 μm to less than 500 μm and a third portion having a d50 size from 500 μm to 1500 μm. Alternatively, the granular material can consist essentially of three portions: the first portion having a d50 size of from 25 μm to less than 100 μm, a second portion having a d50 size of from 100 μm to 200 μm and a third portion having a d50 size from 200 μm to 1500 μm. In a further alternative, the granular material can consist essentially of three portions: comprise a first portion having a d50 size of from 25 μm to 75 μm, a second portion having a d50 size of from 75 μm to 150 μm and a third portion having a d50 size from 150 μm to 500 μm, with each portion having a different size.

The drilling fluid of the process can be an aqueous-based drilling fluid incorporating a clay. The non-hardening tackifying agent of the process can comprise at least one member selected from the group consisting of polyamides, polyacrylates, polyesters, polyethers, polycarbamates, polycarbonates, styrene-butadiene lattices and natural and synthetic resins. Alternatively, the non-hardening tackifying agent can comprise a polyamide.

In one further embodiment of the process, the non-hardening tackifying agent is a pressure sensitive adhesive. The pressure sensitive adhesive can comprise a silicone, polyacrylate, terpenes aromatic resin, pine resin, hydrogenated hydrocarbon resin, polyisbutylense or terpenephenol resin. Alternatively, the pressure sensitive adhesive can consist essentially of silicone, polyacrylate, terpenes aromatic resin, pine resin, hydrogenated hydrocarbon resin, polyisbutylense, terpenephenol resin or combinations thereof. In another further embodiment, the non-hardening tackifying agent is viscoelastic. The non-hardening tackifying agent can be made viscoelastic by dissolving an elastomeric material into the non-hardening tackifying agent. The elastomeric material can be selected from the group consisting essentially of poly(alpha-methylstyrene), styrene-butadiene copoylmers, silicones and combinations thereof.

The granular material of the process can be comprised of carbonate mineral or can consist essentially of carbonate mineral. Alternatively, the granular material can be a metamorphic rock comprised of carbonate mineral. The granular material can be marble. Alternatively, the granular material can consist essentially of marble.

In accordance with another embodiment, there is provided a granular lost circulation material for use in a wellbore during drilling operations to minimize loss of drilling fluid at a lost circulation area. The granular lost circulation material comprises a granular carbonate mineral and a non-hardening tackifying agent. The granular carbonate mineral is coated with the non-hardening tackifying agent. The granular lost circulation material forms agglomerated particles, which form a filter cake at the lost circulation area.

The granular carbonate mineral of the granular lost circulation material can have a d50 particle size of from about 25 μm to about 1500 μm and at least a portion of the agglomerated particles at the lost circulation areas have a d50 size of at least 2000 μm. Additionally, the granular carbonate mineral can comprise a first portion having a d50 size from 5 μm to less than 100 μm, a second portion having a d50 size of from 100 μm to less than 500 μm and a third portion having a d50 size from 500 μm to 1500 μm. Alternatively, the granular carbonate mineral can have a d50 particle size of from about 25 μm to about 1000 μm and at least a portion of the agglomerated particles at the lost circulation areas have a d50 size of at least 2000 μm. Further, the granular material can comprise a first portion having a d50 size of from 25 μm to 75 μm, a second portion having a d50 size of from 75 μm to 150 μm and a third portion having a d50 size from 150 μm to 500 μm with each portion having a different size.

The non-hardening tackifying agent of the granular lost circulation material can comprise at least one member selected from the group consisting of polyamides, polyacrylates, polyesters, polyethers, polycarbamates, polycarbonates, styrene-butadiene lattices and natural and synthetic resins. Alternatively, the non-hardening tackifying agent can comprise a polyamide.

In one further embodiment, the non-hardening tackifying agent is a pressure sensitive adhesive. The pressure sensitive adhesive can comprise a silicone, polyacrylate, terpenes aromatic resin, pine resin, hydrogenated hydrocarbon resin, polyisbutylense or terpenephenol resin. Alternatively, the pressure sensitive adhesive can consist essentially of silicone, polyacrylate, terpenes aromatic resin, pine resin, hydrogenated hydrocarbon resin, polyisbutylense, terpenephenol resin or combinations thereof. In another further embodiment, the non-hardening tackifying agent is viscoelastic. The non-hardening tackifying agent can be made viscoelastic by dissolving an elastomeric material into the non-hardening tackifying agent. The elastomeric material can be selected from the group consisting essentially of poly(alpha-methylstyrene), styrene-butadiene copoylmers, silicones and combinations thereof.

The granular carbonate mineral of the granular lost circulation material can be a metamorphic rock comprised of carbonate mineral or consisting essentially of a carbonate mineral. Further, the granular carbonate mineral can be marble. Alternatively, the granular carbonate mineral can consist essentially of marble.

While various embodiments have been shown and described herein, modifications may be made by one skilled in the art without departing from the spirit and the teachings herein. The embodiments described herein are exemplary only, and are not intended to be limiting. Many variations, combinations, and modifications are possible. Accordingly, the scope of protection is not limited by the description set out above, but is defined by the claims which follow, that scope including all equivalents of the subject matter of the claims.

What is claimed is:

1. A process for drilling a wellbore with a drill bit on a drill string with minimal loss of drilling fluid, the wellbore having a periphery, wherein the process comprises:

(a) providing an aqueous-based drilling fluid with a granular lost circulation material comprising a granular material, wherein said granular material has been coated with a non-hardening tackifying agent;

(b) introducing said aqueous-based drilling fluid with said granular lost circulation material through said drill string during drilling such that said granular lost circulation material forms a plurality of agglomerated particles at lost circulation areas at the periphery of said wellbore so as to form a filter cake at said lost circulation areas and block or reduce fluid flow from said wellbore into said lost circulation areas.

2. The process of claim 1 wherein said granular material comprises a first portion having a d50 size from 5 μm to less than 100 μm, a second portion having a d50 size of from 100 μm to less than 500 μm and a third portion having a d50 size from 500 μm to 1500 μm, and at least a portion of said agglomerated particles having a d50 size of at least 2000 μm.

3. The process of claim 1 wherein said granular material comprises a first portion having a d50 size of from 25 μm to 75 μm, a second portion having a d50 size of from 75 μm to 150 μm and a third portion having a d50 size from 150 μm to 500 μm with each portion having a different size, at least a portion of said agglomerated particles having a d50 size of at least 2000 μm.

4. The process of claim 3 wherein said granular material comprises marble, said aqueous-based drilling fluid incorporates a clay, and wherein said non-hardening tackifying agent is a pressure sensitive adhesive.

5. The process of claim 3 wherein said granular material comprises marble, said aqueous-based drilling fluid incorporates a clay, and wherein said non-hardening tackifying agent is viscoelastic.

6. The process of claim 1 wherein said aqueous-based drilling fluid incorporates a clay, and wherein said non-hardening tackifying agent comprises at least one member selected from the group consisting of polyamides, polyesters, polyethers, polycarbamates, polycarbonates, styrene-butadiene lattices and natural and synthetic resins.

7. The process of claim 1 wherein said non-hardening tackifying agent is a pressure sensitive adhesive.

8. The process of claim 7 wherein said pressure sensitive adhesive comprises a silicone, polyacrylate, terpenes aromatic resin, pine resin, hydrogenated hydrocarbon resin, polyisobutylene or terpenephenol resin.

9. The process of claim 1 wherein said non-hardening tackifying agent is viscoelastic.

10. The process of claim 9 wherein an elastomeric material is dissolved into said non-hardening tackifying agent and said elastomeric material is selected from the group consisting essentially of poly(alpha-methylstyrene), styrene-butadiene, silicones and combinations thereof.

11. The process of claim 1 wherein said granular material is comprised of carbonate mineral.

12. A granular lost circulation material for use in a wellbore during drilling operations to minimize loss of drilling fluid at a lost circulation area, wherein said granular lost circulation material comprises:

a granular carbonate mineral; and a non-hardening tackifying agent, wherein said granular carbonate mineral is coated with said non-hardening tackifying agent and wherein said granular lost circulation material forms agglomerated particles, which form a filter cake at said lost circulation area.

13. The granular lost circulation material of claim 12 wherein said granular carbonate mineral comprises a first portion having a d50 size from 5 μm to less than 100 μm, a second portion having a d50 size of from 100 μm to less than 500 μm and a third portion having a d50 size from 500 μm to 1500 μm and at least a portion of said agglomerated particles at said lost circulation area have a d50 size of at least 2000 μm.

14. The granular lost circulation material of claim 12 wherein said granular carbonate mineral comprises a first portion having a d50 size of from 25 μm to 75 μm, a second portion having a d50 size of from 75 μm to 150 μm and a third portion having a d50 size from 150 μm to 500 μm with each portion having a different size and at least a portion of said agglomerated particles at said lost circulation area have a d50 size of at least 2000 μm.

15. The granular lost circulation material of claim 14 wherein said non-hardening tackifying agent is a pressure sensitive adhesive and said granular carbonate mineral is marble.

16. The granular lost circulation material of claim 14 wherein said non-hardening tackifying agent is viscoelastic and said granular carbonate mineral is marble.

17. The granular lost circulation material of claim 12 wherein said non-hardening tackifying agent comprises at least one member selected from the group consisting of polyamides, polyacrylates, polyesters, polyethers, polycarbamates, polycarbonates, styrene-butadiene lattices and natural and synthetic resins.

18. The granular lost circulation material of claim 12 wherein said non-hardening tackifying agent is a pressure sensitive adhesive.

19. The granular lost circulation material of claim 18 wherein said pressure sensitive adhesive comprises a silicone, polyacrylate, terpenes aromatic resin, pine resin, hydrogenated hydrocarbon resin, polyisobutylene or terpenephenol resin.

20. The granular lost circulation material of claim 12 wherein said non-hardening tackifying agent is viscoelastic.

21. The granular lost circulation material of claim 20 wherein an elastomeric material is dissolved into said non-hardening tackifying agent and said elastomeric material is selected from the group consisting essentially of poly(alpha-methylstyrene), styrene-butadiene copolymers, silicones and combinations thereof.

22. The granular lost circulation material of claim 12 wherein said granular carbonate mineral is marble.

* * * * *